United States Patent
Perng et al.

(10) Patent No.: US 7,836,241 B2
(45) Date of Patent: Nov. 16, 2010

(54) ELECTRONIC APPARATUS HAVING SWITCHING UNIT

(75) Inventors: Nei-chiung Perng, Taipei (TW); Chih-jung Lin, Taoyuan (TW); Ching-jung Yu, Chiayi (TW); Chia-yu Chan, Kaohsiung (TW)

(73) Assignee: Genesys Logic, Inc., Shindian (TW)

( * ) Notice: Subject to any disclaimer, the term of this patent is extended or adjusted under 35 U.S.C. 154(b) by 161 days.

(21) Appl. No.: 12/271,631

(22) Filed: Nov. 14, 2008

(65) Prior Publication Data

US 2010/0125686 A1    May 20, 2010

(51) Int. Cl.
G06F 13/20    (2006.01)
G06F 13/00    (2006.01)

(52) U.S. Cl. .................. 710/313; 710/316; 710/31; 710/62

(58) Field of Classification Search ......... 710/305–316, 710/31–32, 62
See application file for complete search history.

(56) References Cited

U.S. PATENT DOCUMENTS

| | | | |
|---|---|---|---|
| 6,334,164 B1 * | 12/2001 | Okazawa et al. ............ 710/316 |
| 7,478,191 B2 * | 1/2009 | Wurzburg et al. ............ 710/316 |
| 2006/0059293 A1 * | 3/2006 | Wurzburg et al. ............ 710/313 |
| 2007/0245058 A1 * | 10/2007 | Wurzburg et al. ............ 710/313 |
| 2008/0307123 A1 * | 12/2008 | Cheng .......................... 710/31 |
| 2009/0164675 A1 * | 6/2009 | Chen et al. ..................... 710/64 |
| 2010/0100652 A1 * | 4/2010 | Lin et al. ....................... 710/73 |
| 2010/0122010 A1 * | 5/2010 | Yan .............................. 710/316 |

* cited by examiner

*Primary Examiner*—Christopher B Shin
(74) *Attorney, Agent, or Firm*—Kirton & McConkie; Evan R. Witt

(57) ABSTRACT

An electronic apparatus having switching unit is described. The electronic apparatus includes a first peripheral device, a second peripheral device and a switching unit. The first peripheral device communicates with the host unit. The second peripheral device communicates with the host unit and the first peripheral device, respectively. The switching unit switches to the host unit and the first peripheral device for allowing the host unit to access the first peripheral device via a first path. The switching unit switches to the host unit and the second peripheral device for allowing the host unit to access the second peripheral device via a second path. The switching unit switches to the first peripheral device and the second peripheral device for allowing the first peripheral device to access the second peripheral device via a third path.

12 Claims, 3 Drawing Sheets

US 7,836,241 B2

ELECTRONIC APPARATUS HAVING SWITCHING UNIT

FIELD OF THE INVENTION

The present invention relates to an electronic apparatus, and more particularly relates to an electronic apparatus having a three-way switching unit.

BACKGROUND OF THE INVENTION

The communication mode of the universal serial bus (USB) adopts a client-server type which operates in the form of tiered star topology architecture. Generally speaking, only one USB host can be used in the tiered star topology architecture. The USB host in the tiered star topology architecture is a control center. The USB hub generates a plurality of tiered nodes and each node is connected to downstream USB hubs or USB devices. The USB host connected to the USB hub controls the USB hub for accessing the USB devices via the USB hubs. The USB devices may be a keyboard, a mouse or storage drives utilized in a computer system. Generally, USB bus adopting the client/server type and operated in the tiered star topology architecture only allows the USB host to communicate with the USB device at a peer-to-peer mode and access the data stored in the USB device. In other words, if it is necessary that one USB device communicates with another USB device under the control of the USB host, the USB host needs to dominate the operation of the communication with the USB devices. While a plurality of USB devices desire to communicate with the USB host, each USB device utilizes the time-sharing scheme for exchanging data with the USB host.

When one USB device needs to disadvantageously communicate with another USB device, the two USB devices first communicate with the USB host, respectively and the USB host then transfers the data from one USB device to another USB device. As shown in FIGS. 1A-1B, they illustrate conventional schematic diagrams of USB device which is selectively controlled by USB host and USB OTG (on-the-go) device. The USB OTG device manually serves as either a USB device or a USB host. That is, the USB OTG device cannot implement the functions of USB device and host synchronously. In FIG. 1A, the USB OTG device 100 in a digital photo frame 106 is selectively switched to be connected to the USB host 102 when the USB OTG device 100 serves as a USB device and the USB host 102 desires to access the USB OTG device 100. In FIG. 1B, the USB OTG device 100 is selectively switched to be connected to the external USB device 104 when the USB OTG device 100 serves as a host and the USB OTG device 100 desires to access the external USB device 104. It is quite inconvenient for the system since the USB OTG device 100 is incapable of directly communicating with the external USB device 104 and USB host 102.

Consequentially, there is a need to develop a novel electronic apparatus among the USB devices and the USB host to solve the above-mentioned problem.

SUMMARY OF THE INVENTION

The objective of the present invention is to provide an electronic apparatus having a three-way switching unit for conveniently switching to the second peripheral device by the host unit and/or first peripheral device.

According to the above objective, the present invention sets forth an electronic apparatus having a switch. The electronic apparatus includes a first peripheral device, a second peripheral device and a switching unit. The first peripheral device communicates with the host unit. The second peripheral device communicates with the host unit and the first peripheral device. The switching unit switches to the host unit and the first peripheral device for allowing the host unit to access the first peripheral device via a first path. The switching unit switches to the host unit and the second peripheral device for allowing the host unit to access the second peripheral device via a second path. The switching unit switches to the first peripheral device and the second peripheral device for allowing the first peripheral device to access the second peripheral device via a third path.

According to the above-mentioned descriptions, the electronic apparatus is suitable for USB host and USB OTG device which adopt client-server type. Further, the second peripheral device is accessed by both the host unit and the first peripheral device, respectively, while the switching unit of the electronic apparatus performs a switch operation among the first peripheral device, second peripheral device and host unit. Thus, the electronic apparatus having a three-way switching unit conveniently switches to the second peripheral device by the host unit and/or first peripheral device. Therefore, it is quite convenient for the system since the second peripheral device is incapable of directly communicating with the host unit and first peripheral device by using the switching unit.

The switching unit further includes a first selecting module and a second selecting module. The first selecting module has a first switch node in the first path and a second switch node in the second path for activating one of the first switch node and the second switch node. The second selecting module has a third switch node in the first path and a fourth switch node in the third path for activating one of the third switch node and the fourth switch node.

According to the above-mentioned descriptions, the electronic apparatus having a three-way switching unit conveniently switches to the second peripheral device by the host unit and/or first peripheral device wherein the host unit and first peripheral device can effectively manipulate the switch operation.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1A:
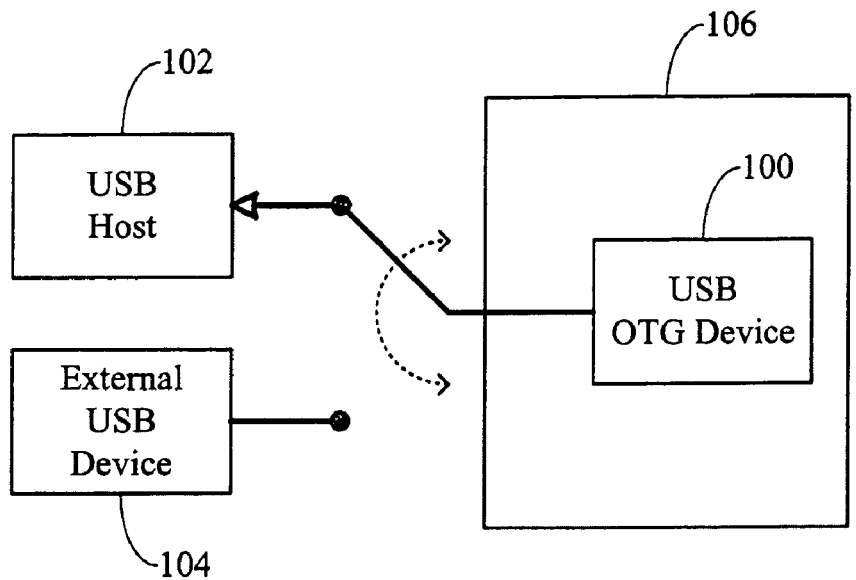
FIGS. 1A-1B are conventional schematic diagrams of USB device which is selectively controlled by USB host and USB OTG device.
Figure 1B:
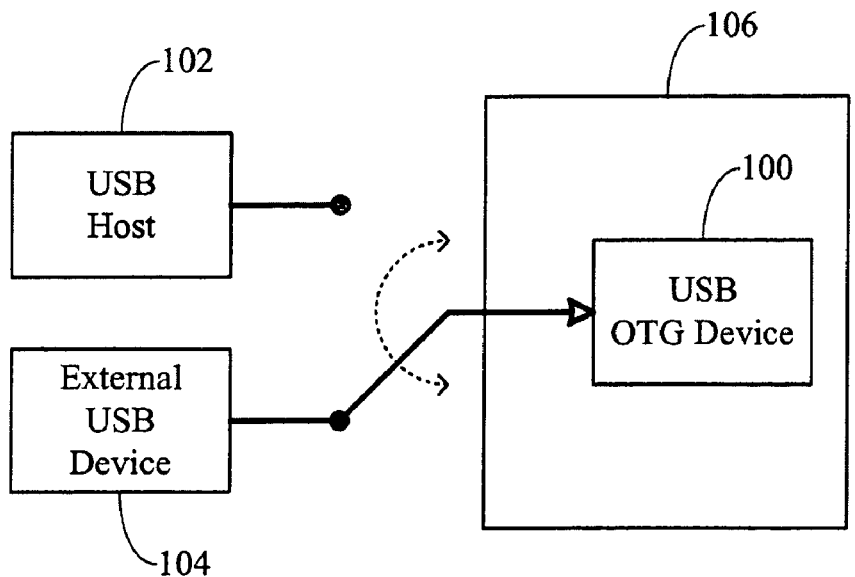
Figure 2:
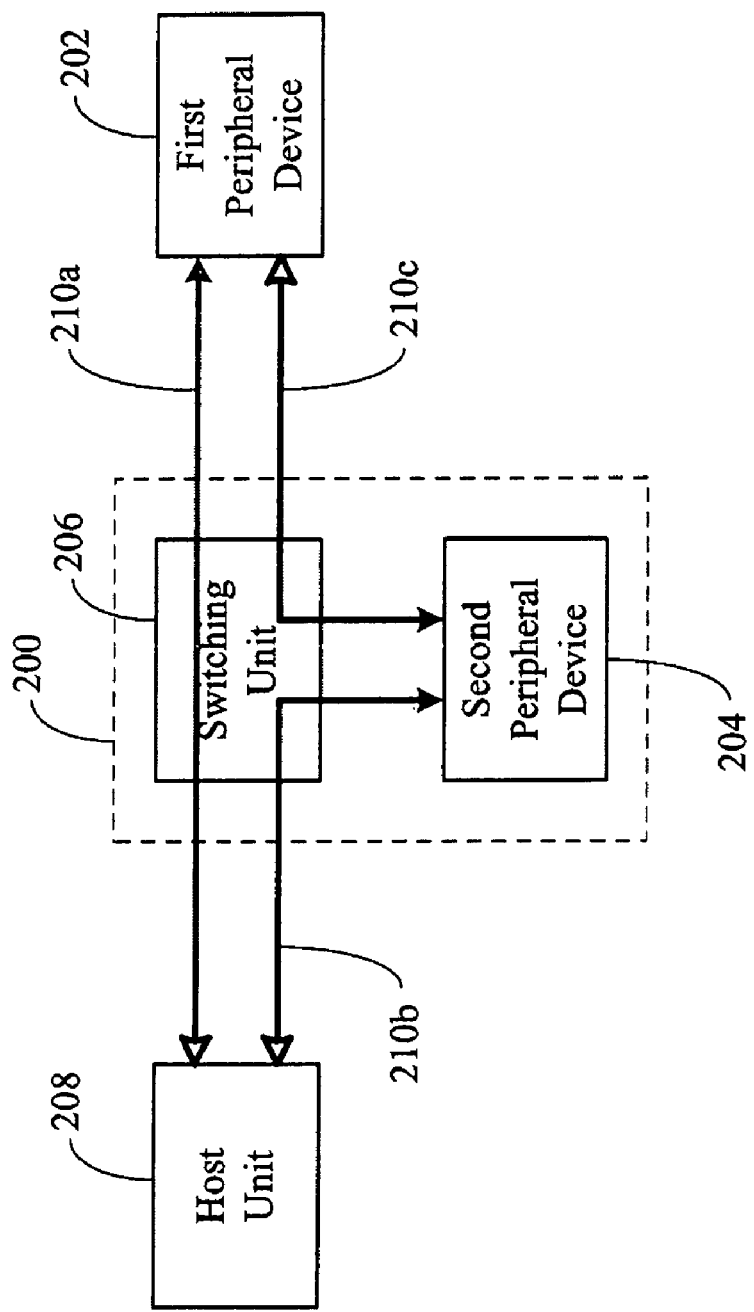
FIG. 2 is a schematic diagram of an electronic apparatus having three-way switching unit according to one embodiment of the present invention.

FIG. 2 is a schematic diagram of an electronic apparatus 200 having three-way switching unit 206 according to one embodiment of the present invention. The electronic apparatus 200 includes a first peripheral device 202, a second peripheral device 204 and a switching unit 206. In one embodiment, the electronic apparatus 200 includes the second peripheral device 204 and the switching unit 206. The switching unit 206 couples a host unit 208 to the first peripheral device 202 and the second peripheral device 204, respectively. The switching unit 206 couples the first peripheral device 202 to the second peripheral device 204, respectively. For example, the first peripheral device 202 is universal serial bus (USB) OTG (on-the-go) device which is applicable to mobile phone or digital photo frame. The host unit 208 is preferably USB host which is compatible with USB protocol standard. It should be noted that the second peripheral device 204 and the switching unit 206 can be integrated into the first peripheral device 202.

The first peripheral device 202 communicates with the host unit 208. The second peripheral device 204 communicates with the host unit 208 and the first peripheral device 202, respectively. The switching unit 206 switches to the host unit 208 and the first peripheral device 202 for allowing the host unit 208 to access the first peripheral 202 device via first path 210a. The switching unit 206 switches to the host unit 208 and the second peripheral device 204 for allowing the host unit 208 to access the second peripheral device 204 via second path 210b. The switching unit 206 switches to the first peripheral device 202 and the second peripheral device 204 for allowing the first peripheral device 202 to access the second peripheral device 204 via third path 210c. In one embodiment, the first path 210a, the second path 210b, and the third path 210c includes two data wires, respectively.

In one embodiment, the first peripheral device 202 is compatible with USB protocol standard. The second peripheral device 204 is compatible with USB protocol standard. For example, the second peripheral device 204 is a USB hub which is compatible with USB protocol standard.

According to the above-mentioned descriptions, the electronic apparatus 200 is suitable for USB host and USB OTG device which adopt client-server type. Further, the second peripheral device 204 is accessed by both the host unit 208 and the first peripheral device 202, respectively, while the switching unit 206 of the electronic apparatus 200 performs a switch operation among the first peripheral device 202, second peripheral device 204 and host unit 208. Thus, the electronic apparatus 200 having a three-way switching unit 206 conveniently switches to the second peripheral device 204 by the host unit 208 and/or first peripheral device 202. The electronic apparatus 200 directly serves as both the USB device and the USB host for communicating with the host unit 208. Therefore, it is quite convenient for the system since the second peripheral device 204 is incapable of directly communicating with the host unit 208 and first peripheral device 202 by using the switching unit 206. The switching unit 206 will be described in detail as follows.

Figure 3:
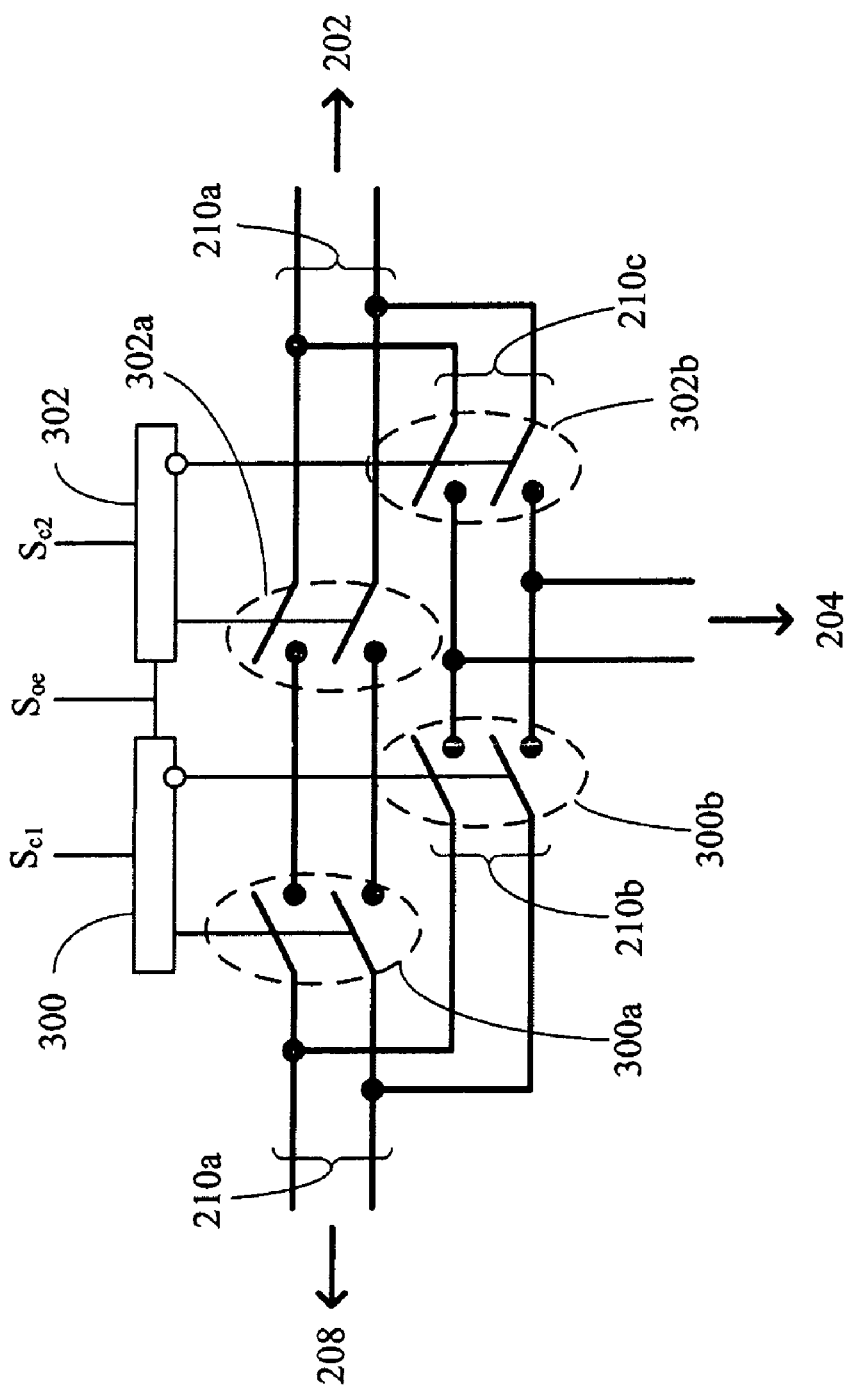
FIG. 3 is a detailed schematic diagram of a three-way switching unit which is positioned in the electronic apparatus according to one embodiment of the present invention.

Please refer to FIG. 2 and FIG. 3. FIG. 3 is a detailed schematic diagram of a switching unit 206 which is positioned in the electronic apparatus 200 according to one embodiment of the present invention. The switching unit 206 further includes a first selecting module 300 and a second selecting module 302. The first selecting module 300 has a first switch node 300a in the first path 210a and a second switch node 300b in the second path 210b for activating one of the first switch node 300a and the second switch node 300b. The second selecting module 302 has a third switch node 302a in the first path 210a and a fourth switch node 320b in the third path 210c for activating one of the third switch node 302a and the fourth switch node 302b.

If the first switch node 300a of the first selecting module 300 and the third switch node 302a of the second selecting module 302 are activated, the host unit 208 accesses the first peripheral device 202 via the first path 210a. If the second switch node 300b of the first selecting module 300 and/or the third switch node 302a of the second selecting module 302 are activated, the host unit 208 accesses the second peripheral device 202 via the second path 210b. If the first switch node 300a of the first selecting module 300 and the fourth switch node 302b of the second selecting module 302 are activated, the first peripheral device 202 accesses the second peripheral device 204 at the third path 210c. Specifically, when the switching unit 206 is enabled, the signal level of the first switch node 300a is opposite to the signal level of second switch node 300b in the first selecting module 300. Similarly, when the switching unit 206 is enabled, the signal level of the third switch node 302a is opposite to the signal level of fourth switch node 302b in the second selecting module 302.

The first path 210a between the host unit 208 and the first peripheral device 202 is controlled to be turn-on/turn-off by the first switch node 300a and third switch node 302a. The second path 210b between the host unit 208 and the second peripheral device 204 is controlled to be turn-on/turn-off by the second switch node 300b in the first selecting module 300. The third path 210c between the first peripheral device 202 and the second peripheral device 204 is controlled to be turn-on/turn-off by fourth switch node 302b in the second selecting module 302. In one embodiment, when the second path 210b and the third path 210c are controlled to be turn-on by the second switch node 300b and fourth switch node 302b, respectively, the second peripheral device 204 is incapable of directly communicating with the host unit 208 and first peripheral device 202 by using the switching unit 206.

In one embodiment, the first peripheral device 202 further issues an output enabling signal ($S_{oe}$) for enabling the switching unit 206. The first peripheral device 202 issues a first control signal ($S_{c1}$) for activating the first selecting module 300 and issues a second control signal ($S_{c2}$) for activating the second selecting module 302. That is, the first control signal ($S_{c1}$) enables either the first switch node 300a or the second switch node 300b of the first selecting module 300. The second control signal ($S_{c2}$) enables either the third switch node 302a or the fourth switch node 302b of the second selecting module 302.

According to the above-mentioned descriptions, the electronic apparatus having a three-way switching unit conveniently switches to the second peripheral device by the host unit and/or first peripheral device wherein the host unit and first peripheral device can effectively manipulate the switch operation.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. An electronic apparatus coupled to a host unit, the electronic apparatus comprising:
   a first peripheral device, for communicating with the host unit;
   a second peripheral device, for communicating with the host unit and the first peripheral device, respectively; and
   a switching unit, switching to the host unit and the first peripheral device for allowing the host unit to access the first peripheral device via a first path, switching to the host unit and the second peripheral device for allowing the host unit to access the second peripheral device via a second path, and switching to the first peripheral device and the second peripheral device for allowing the first peripheral device to access the second peripheral device via a third path, wherein the switching unit further comprises:

a first selecting module having a first switch node in the first path and a second switch node in the second path, for activating one of the first switch node and the second switch node; and a second selecting module having a third switch node in the first path and a fourth switch node in the third path, for activating one of the third switch node and the fourth switch node;

wherein if the first switch node of the first selecting module and the third switch node of the second selecting module are activated, the host unit accesses the first peripheral device via the first path, if the second switch node of the first selecting module is activated, the host unit accesses the second peripheral device via the second path, and if the fourth switch node of the second selecting module is activated, the first peripheral device accesses the second peripheral device via the third path.

2. The electronic apparatus of claim 1, wherein the first peripheral device further issues an enabling signal for enabling the switching unit.

3. The electronic apparatus of claim 1, wherein the first peripheral device issues a first control signal for activating the first selecting module and issues second control signal for activating the second selecting module.

4. The electronic apparatus of claim 1, wherein the first peripheral device is compatible with USB protocol standard.

5. The electronic apparatus of claim 1, wherein the second peripheral device is compatible with USB protocol standard.

6. The electronic apparatus of claim 5, wherein the second peripheral device is a USB hub.

7. An electronic apparatus coupled to a host unit and a first peripheral device, the electronic apparatus comprising:

a second peripheral device, selectively communicating with the host unit and the first peripheral device; and a switching unit, switching to the host unit and the first peripheral device for allowing the host unit to access the first peripheral device via a first path, switching to the host unit and the second peripheral device for allowing the host unit to access the second peripheral device via a second path, and switching to the first peripheral device and the second peripheral device for allowing the first peripheral device to access the second peripheral device via a third path, wherein the switching unit further comprises:

a first selecting module having a first switch node in the first path and a second switch node in the second path, for activating one of the first switch node and the second switch node; and a second selecting module having a third switch node in the first path and a fourth switch node in the third path, for activating one of the third switch node and the fourth switch node;

wherein if the first switch node of the first selecting module and the third switch node of the second selecting module are activated, the host unit accesses the first peripheral device via the first path, if the second switch node of the first selecting module is activated, the host unit accesses the second peripheral device via the second path, and if the fourth switch node of the second selecting module is activated, the first peripheral device accesses the second peripheral device via the third path.

8. The electronic apparatus of claim 7, wherein the first peripheral device further issues an enabling signal for enabling the switching unit.

9. The electronic apparatus of claim 7, wherein the first peripheral device issues a first control signal for activating the first selecting module and issues second control signal for activating the second selecting module.

10. The electronic apparatus of claim 7, wherein the first peripheral device is compatible with USB protocol standard.

11. The electronic apparatus of claim 7, wherein the second peripheral device is compatible with USB protocol standard.

12. The electronic apparatus of claim 11, wherein the second peripheral device is a USB hub.

* * * * *